April 18, 1950     C. C. LEGAL, JR., ET AL     2,504,544
PROCESS OF MANUFACTURING PHOSPHORIC ACID
Filed Jan. 28, 1947
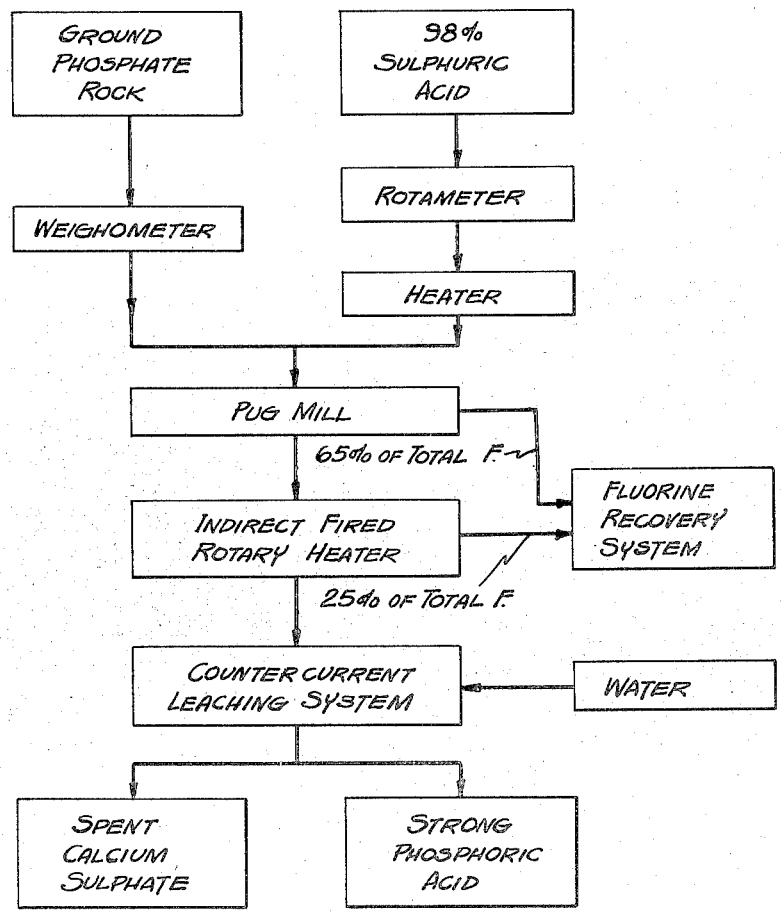
Inventors
CASIMER C. LEGAL JR.
THOMAS O. TONGUE
EDWARD H. WIGHT Patented Apr. 18, 1950

2,504,544

UNITED STATES PATENT OFFICE 2,504,544

PROCESS OF MANUFACTURING PHOSPHORIC ACID

Casimer C. Legal, Jr., Pasadena, Thomas O. Tongue, Curtis Bay, and Edward H. Wight, Baltimore, Md., assignors to The Davison Chemical Corporation, Baltimore, Md.

Application January 28, 1947, Serial No. 724,816

4 Claims. (Cl. 23—165)

This invention relates to the manufacture of phosphoric acid by the so-called wet process in which phosphate rock is treated with sulphuric acid, and more particularly has reference to such a process in which conditions are controlled to obtain an acid of high concentration with a minimum of fluorine content.

In the manufacture of phosphoric acid by the action of sulphuric acid on phosphate rock as heretofore practiced, the resulting acid was of low concentration and contained a fairly high percentage of the original fluorine content of the phosphate rock.

One object of this invention is the direct production of strong phosphoric acid containing about 75% $H_3PO_4$ by means of a wet process without resorting to evaporation.

Another object of this invention is the production of phosphoric acid by a method wherein up to 98% of the fluorine originally present in the phosphate rock is eliminated.

Yet another object of this invention is the manufacture of phosphoric acid of such purity that it can be used without any treatment, directly in the manufacture of phosphatic animal feed supplements or for use as silage preservative.

Still another object of this invention is the manufacture of a wet phosphoric acid with a fluorine content low enough to allow low cost treatment to bring it down to a point where the phosphoric acid may be used for food purposes as for instance the manufacture of monocalcium phosphate for baking powder or self-rising flour.

Other objects will appear more fully hereinafter.

In order to facilitate an understanding of this invention, reference is made to the accompanying drawing in which the single figure is a diagrammatic representation of a flow sheet showing the several steps of the process in sequence.

In carrying out the present invention, a dry, finely divided phosphate rock was used which had a composition as follows:

|                | Per cent |
|----------------|----------|
| Moisture       | 0.70     |
| Total $P_2O_5$ | 33.00    |
| Total CaO      | 45.79    |
| Fluorine       | 3.66     |

As diagrammatically illustrated in the accompanying drawing, ground phosphate rock of the above composition is continuously fed through a weighometer into a pug mill. Simultaneously, a supply of sulphuric acid containing about 98% $H_2SO_4$ is continuously passed through a rotameter and through a heater, and thence to the pug mill for admixture with the ground phosphate rock. It will be noted that the phosphate rock which is ground and in finely divided form is dry. In the heater, the 98% sulphuric acid is preferably heated to a temperature ranging between 100° C. and 300° C. although preheating of the acid is not absolutely necessary. When temperatures substantially over 100° C. are used, it is advisable to carry out the heating operation in a closed apparatus.

The phosphate rock and sulphuric acid are introduced in a ratio of about 240 parts by weight of phosphate rock to about 205 parts by weight of the 98% sulphuric acid. As indicated, the rock and acid are mixed, preferably, continuously.

During the mixing operation, approximately 65% of the total fluorine present in the phosphate rock is volatilized. After mixing, the mixture is passed into an indirectly fired rotary heater in which it is heated to a temperature ranging from 200° C. to 300° C. for a period of about 10 to 30 minutes. A direct fired heater may also be used, but when maximum fluorine recovery is desired, the indirect method is preferred. During the heat treatment, approximately 25% additional fluorine is driven off so that altogether about 90% of the fluorine present in the phosphate rock is eliminated in an easily recoverable form. As indicated on the drawing, the fluorine evolved in the pug mill and, also, the fluorine evolved in the rotary heater, are passed to a fluorine recovery system.

The calcined product is transported directly, preferably, without substantial cooling, into a system of counter-current leaching tanks. The heat treated product is dropped directly into the strong phosphoric acid. In the counter-current leaching operation which may utilize a series of 6 or 8 units, the liquid flow is always downward and thus actually the leaching operation is a step counter-current procedure.

In the leaching system, the leaching liquid, which is water, will be brought first into contact with the nearly spent clinker, whereas the leaching medium, after it has taken up a considerable portion of the $P_2O_5$ from the clinker, is brought into contact with the freshly heated mixture, and the overflow from this last contacting step is the production acid.

The residue from the leaching operation, which is substantially calcium sulphate, may be disposed of in any desired manner.

Enough sulphuric acid should be used in the original mix to take care of all reactible compounds present in the phosphate rock. This means not only the tricalcium phosphate but also the calcium carbonate and calcium fluoride as well as iron and alumina compounds present in the rock. If there is a deficiency of sulphuric acid in the original mix, then the resulting product after heat treatment does not perform satisfactorily in the leaching system because it has a tendency to disintegrate and choke up the system. Therefore, it is better to have a slight excess of sulphuric acid rather than a slight deficiency in the original mix.

Phosphoric acid produced in the countercurrent leaching system can easily be taken out as 75% $H_3PO_4$ or even higher concentration. The extraction in the leaching system is so thorough that it shows a recovery of up to 99% of the $P_2O_5$ present in the phosphate rock.

An example of the analysis of the phosphoric acid produced in this manner is as follows:

|  | Per cent |
|---|---|
| Total $P_2O_5$ | 53.70 |
| $SO_3$ | 1.72 |
| F | 0.12 |

A total $P_2O_5$ content of 53.70% would correspond to 74.1% $H_3PO_4$. There is, however, a small amount of iron and alumina present in the acid, so that all the $P_2O_5$ cannot be counted as free $H_3PO_4$. The $Fe_2O_3$ and $Al_2O_3$ content of the acid is around 2.5%.

Practically all wet process phosphoric acid produced industrially up to the present time has used the well known Dorr process or modifications thereof. This phosphoric acid from the filters contains around 32.0% $P_2O_5$ and about 2.0% fluorine. The corresponding figures for the acid produced by the process of this invention are 53.7% $P_2O_5$ and 0.12% fluorine. On an equivalent $P_2O_5$ basis the Dorr acid contains over 25 times more fluorine than the acid from this process. This is a startling difference.

In addition to the advantage of the product of this invention being a very strong phosphoric acid which requires no evaporation prior to its use in the manufacture of triple superphosphate, the fluorine content of this strong acid of 75% $H_3PO_4$ is only a small fraction of that of prior wet phosphoric acid. The actual fluorine content is from 0.1 to 0.2%. This means that on the basis of $P_2O_5$ content, the fluorine in the acid is only from 2 to 5% of that originally present in the rock.

Actually the fluorine content is so low that the phosphoric acid can be used directly as silage preservative. Moreover, it can be neutralized with hydrated lime so that a solid product results which is eminently satisfactory as a phosphatic animal feed supplement.

A phosphatic animal feed supplement made by mixing 63 parts by weight of the phosphoric acid of the above given analysis with 50 parts by weight of hydrated lime produced a dry material with the following analysis:

|  | Per cent |
|---|---|
| $P_2O_5$ | 34.30 |
| CaO | 38.13 |
| F | .08 |

The ratio of CaO to $P_2O_5$ is 1.12. The same ratio in pure tricalcium phosphate is 1.18. To be properly assimilated during animal metabolism, the ratio in question should closely approach the latter figure. Additional calcium can of course be furnished in the form of $CaCO_3$ as ground limestone which is fully assimilable. Taking this into account, it is an advantage to supply the phosphatic material in as concentrated form as practical to the feed manufacturer, who then corrects the CaO/$P_2O_5$ ratio to the proper figure when he makes the final feed mixture.

A material having a higher $P_2O_5$ concentration is produced by mixing 60 parts of the acid with 22 parts of hydrated lime. A dry product results, with the following analysis:

|  | Per cent |
|---|---|
| $P_2O_5$ | 45.00 |
| CaO | 22.62 |
| F | .11 |

The moisture content of the above product is about 18%, mostly present as water of crystallization because the product is dry and friable. By eliminating 10% moisture, the $P_2O_5$ content can be easily brought up to 50%.

It should be noted that the fluorine content is far below the permissible limit which is 0.3% F. for a product containing 30% $P_2O_5$—on a basis of 30% $P_2O_5$ the product of this invention contains 0.07% F. or less than ¼ of the permissible amount.

The fluorine content of the strong phosphoric acid made by the process of this invention is so low that a simple additional treatment with hydrous silicates, as for instance silica gel, will easily accomplish the removal of the fluorine to a point low enough to make the phosphoric acid available for the production of monocalcium phosphate for leavening purposes.

Although the use of 98% acid has been featured in the foregoing description, a weaker acid can, of course, be used, i. e. a 60° or 66° Bé. sulphuric acid. This would not be as economical as 98% acid because it would require substantial moisture elimination from the mixing during the heat treating operation.

From the foregoing, it will be realized that the present invention provides a process of producing strong phosphoric acid directly by an aqueous leaching of phosphate rock after mixing with sulphuric acid and with a very low fluorine, even though the phosphate rock has a usual fluorine content.

We claim:

1. A process for the manufacture of concentrated phosphoric acid in concentrations up to 75% $H_3PO_4$ having a low fluorine content comprising mixing finely divided phosphate rock with about 98% sulphuric acid in an acid to rock ratio ranging from a value at least high enough to a value slightly in excess of that necessary to react with all sulphuric acid reactible compounds in the rock and form phosphoric acid from the calcium phosphate in the rock, heating the mixture of rock and acid to a temperature ranging from about 200° C. to 300° C. to form a clinker, said mixing and heating steps volatilizing about 90% of the fluorine in the phosphate rock to form a clinker substantially free of fluorine, and leaching the clinker with water to form phosphoric acid.

2. A process for the manufacture of concentrated phosphoric acid in concentrations up to 75% $H_3PO_4$ characterized by a low fluorine concentration comprising heating about 98% sulphuric acid to about 100° C. to 200° C., mixing finely divided phosphate rock with the 98% sulphuric acid in an acid to rock ratio ranging from a value at least high enough to a value slightly in excess of that necessary to react with all sulphuric acid reactible compounds in the rock and form phosphoric acid from the calcium phosphate in the rock, maintaining the mixture of rock and acid at a temperature ranging from about 200° C. to 300° C. to form a clinker, about 90% of the fluorine in the phosphate rock volatilizing during the mixing and clinker forming periods to form a clinker substantially free of fluorine, and leaching the clinker with water to form phosphoric acid.

3. A process for the manufacture of concentrated phosphoric acid in concentrations up to 75% $H_3PO_4$ characterized by a low fluorine concentration comprising mixing finely divided phosphate rock with about 98% sulphuric acid in an acid to rock ratio ranging from a value at least high enough to a value slightly in excess of that necessary to react with all sulphuric acid reactible compounds in the rock and form phosphoric acid from the calcium phosphate in the rock, heating the mixture of rock and acid to a temperature ranging from about 200° C. to 300° C. to form a clinker, said mixing and heating steps volatilizing about 90% of the fluorine in the phosphate rock to form a clinker substantially free of fluorine, and passing water substantially countercurrently in contact with the clinker to leach phosphoric acid from the rock.

4. A process for the manufacture of phosphoric acid in concentrations of up to 75% $H_3PO_4$ characterized by a low fluorine concentration comprising mixing about 240 parts by weight of dry finely divided phosphate rock with about 205 parts by weight of about 98% sulphuric acid at a temperature ranging from about 100° C. to 300° C., maintaining the mixture at a temperature ranging from about 200° C. to 300° C. for a period of about ten to thirty minutes to form a clinker, about 90% of the fluorine being volatilized from the rock during the mixing and clinker forming steps, and leaching phosphoric acid from the clinker with water.

CASIMER C. LEGAL, JR.
THOMAS O. TONGUE.
EDWARD H. WIGHT.

REFERENCES CITED

The following references are of record in the file of this patent:

UNITED STATES PATENTS

| Number | Name | Date |
|---|---|---|
| 1,712,404 | Rupp | Mar. 7, 1929 |
| 1,851,179 | Hechenbleikner | Mar. 29, 1932 |
| 1,929,442 | Milligan | Oct. 10, 1933 |
| 2,338,407 | Coleman | Jan. 4, 1944 |

FOREIGN PATENTS

| Number | Country | Date |
|---|---|---|
| 165,759 | Great Britain | Nov. 21, 1921 |
| 295,848 | Great Britain | Aug. 23, 1928 |